United States Patent [19]

Kalajan

[11] Patent Number: 5,941,954

[45] Date of Patent: Aug. 24, 1999

[54] NETWORK MESSAGE REDIRECTION

[75] Inventor: Kevin E. Kalajan, Redwood City, Calif.

[73] Assignee: Sun Microsystems, Inc., Palo Alto, Calif.

[21] Appl. No.: 08/941,971

[22] Filed: Oct. 1, 1997

[51] Int. Cl.[6] .................................................. G06F 17/00
[52] U.S. Cl. ............................................................ 709/239
[58] Field of Search ................................. 395/683, 200.43, 395/200.44, 200.69

[56] References Cited

U.S. PATENT DOCUMENTS 5,253,288  10/1993  Frey et al. ........................ 395/200.44
5,390,316  2/1995  Cramer et al. ..................... 395/200.43
5,522,071  5/1996  Guillen et al. .......................... 395/683

Primary Examiner—Ellis B. Ramirez
Attorney, Agent, or Firm—Fish & Richardson P.C.

[57] ABSTRACT

A method for redirecting communication on a network between a client and a network resource includes executing a software program, the software program configured to listen to at least one communications port of the client during the communication session, the software program redirecting a message received on the communications port to the network resource.

28 Claims, 3 Drawing Sheets

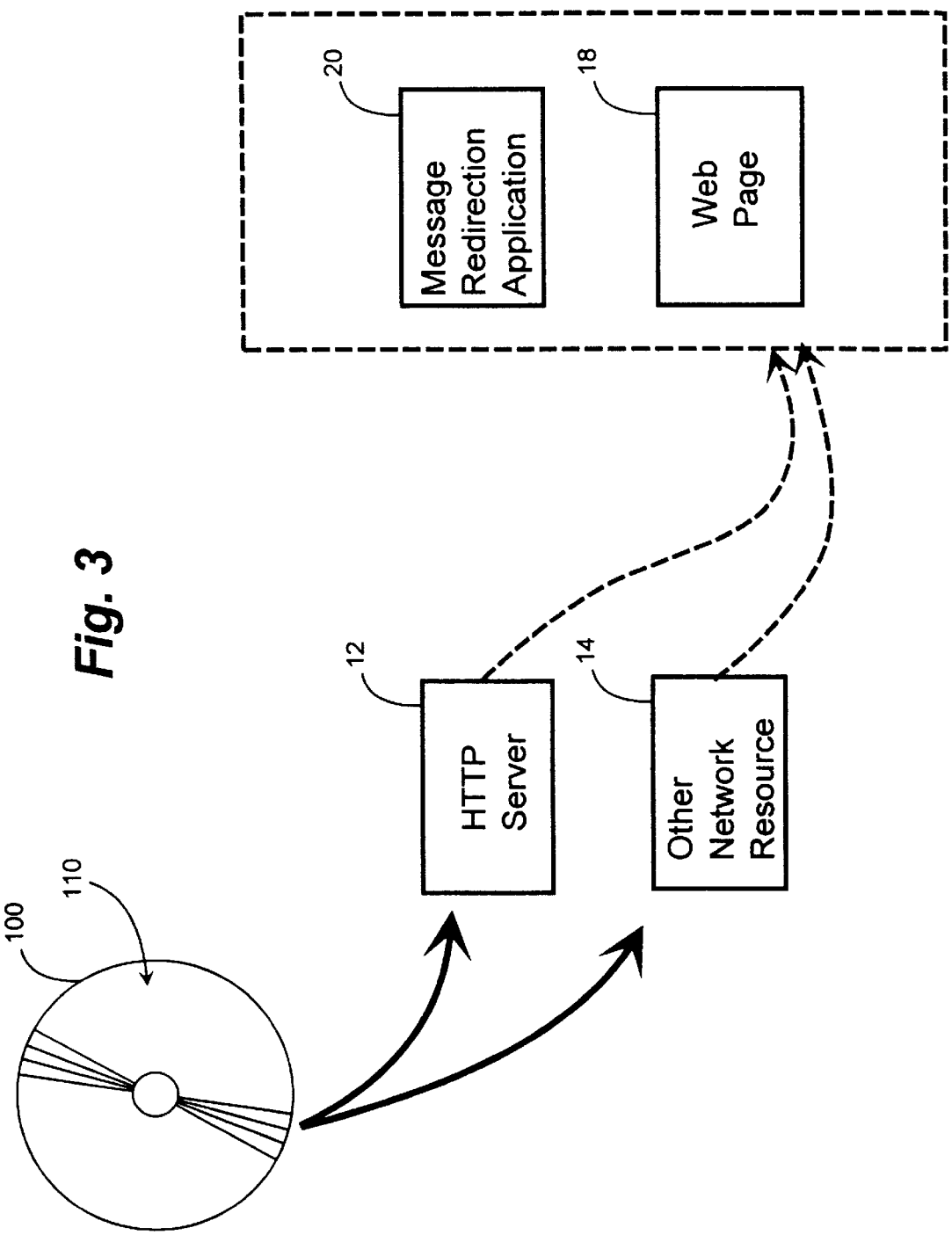

NETWORK MESSAGE REDIRECTION

BACKGROUND

The present invention relates generally to electronic communications.

Networks provide communication sessions between clients and servers where, generally speaking, clients request information provided by servers. Some networks provide a high degree of security, so that messages passing between clients and servers are protected from unauthorized interception, reading, or tampering. Other networks, particularly more public networks such as the Internet, do not themselves necessarily protect from unauthorized reception of messages. Communications sessions and messages can be encoded to lend a degree of protection.

As accessibility to the Internet from remote locations continues to become more widely available and convenient, utilizing the Internet to perform tasks such as remotely accessing electronic mail and databases becomes increasingly desirable. Some methods have been developed to allow a remote user to establish secure communications sessions. For example, a variety of encryption methods have been developed at several network levels, such as at the transport protocol level (with, e.g., HTTPS) and the application level (with, e.g., encryption of transported files).

Servers on public networks are also vulnerable to discovery by unauthorized users, who can attempt to gain access to such servers to obtain otherwise confidential information. Fire walls have been developed which help protect against unwanted intruders. Users, after logging onto a public network server, can be identified by any of a number of schemes (e.g., passwords), and then be transferred to other servers to access more sensitive information.

SUMMARY

In general, in one aspect, the invention features a method for redirecting communication on a network between a client and a network resource, including executing a software program, the software program configured to listen to at least one communications port of the client during the communication session, the software program redirecting a message received on the communications port to the network resource.

Embodiments of the invention may include one or more of the following features. The software program can be downloaded to the client during a communication session. The software program can be downloaded from an HTTP-protocol server. An HTTP-protocol browser can be configured to connect to the HTTP-protocol server to download the software program. The network can be the Internet. A general purpose application running on the client can be configured to send messages to the communications port, and the general purpose application can generate the message received on the communications port. The general purpose application can connect to either the local host address or the local IP address for the client, and the communications port can be a port used by the general purpose application. The network resource can be a IP protocol-based network resource. The software program can be hardware platform independent, and, before downloading to the client, can be selectively configured with parameters for redirecting the messages. The message can be manipulated before redirecting the message to the network resource, and manipulating the message can include encrypting, compressing, logging, filtering, or vectoring the message.

In general, in another aspect, the invention features a method for redirecting communication on the Internet between a client and a network resource, including configuring an HTTP-protocol browser on the client to connect to an HTTP-protocol server to download a software program, the software program being hardware platform independent, downloading the software program to the client during a communication session, configuring a general purpose application running on the client to connect to either the local host address or the local IP address for the client and to send a message destined for the network resource instead to a communications port of the client, the communications port comprising either the local host port or the local IP address for the client, and executing the software program, the software program configured to listen to at least one communications port of the client during the communication session, the software program redirecting the message received on the communications port to the network resource.

In general, in another aspect, the invention features a storage device tangibly storing a control program, the control program, when coupled to a control device, operating the control device to redirect communication on a network between a client and a network resource, the control program being configured to operate the control device to perform the functions of providing a software program configured to listen to at least one communications port of the client during the communication session, the software program redirecting a message received on the communications port to the network resource.

In general, in another aspect, the invention features a storage device tangibly storing a control program, the control program, when coupled to a control device, operating the control device to redirect communication on the Internet between a client and a network resource, the control program being configured to operate the control device to perform the functions of downloading a software program from an HTTP-protocol server to an HTTP-protocol browser on the client, the software program being hardware platform independent, the software program, when downloaded and executing on the client, being configured to listen to at least one communications port of the client during the communication session, and the software program redirecting a message received on the communications port to the network resource, the message being destined for the network resource but sent to the communications port by a general purpose application running on the client, the general purpose application being connected to either the local host address or the local IP address for the client.

Advantages of the invention may include one or more of the following. Network messages can be redirected from a local port or address to a destination network resource across a network in a manner completely transparent to the user. A message redirection application can be written in a platform-independent language such as Java® or ActiveX®, being executable upon downloading to redirect message traffic without compiling separate executable files for different client hardware platforms, and without requiring the client system to reboot, as is typically required to install new transport software code within operating system kernels. Redirected messages can be transparently manipulated, for example, through compression and encryption, without user intervention or even knowledge. The same message redirection application can redirect and manipulate messages for many different general purpose applications and many different client hardware platforms and operating systems. The message redirection application can be completely configured by the network server (for example, an HTTP web server) that provides the application for downloading to clients, requiring no user configuration. The message redirection application can work at the transport layer rather than the network layer, enormously simplifying message redirection. Also, the message redirection application can readily handle message redirection for clients which have dynamic public and/or private IP addresses, in which case, the message redirection application can be dynamically configured to redirect messages to the dynamic address.

These and other features and advantages of the present invention will become more apparent from the following description, drawings, and claims.

DRAWINGS

FIG. 3 is a block diagram of a machine-readable device encoded with software for generating a message redirection application.

DESCRIPTION

Figure 1:
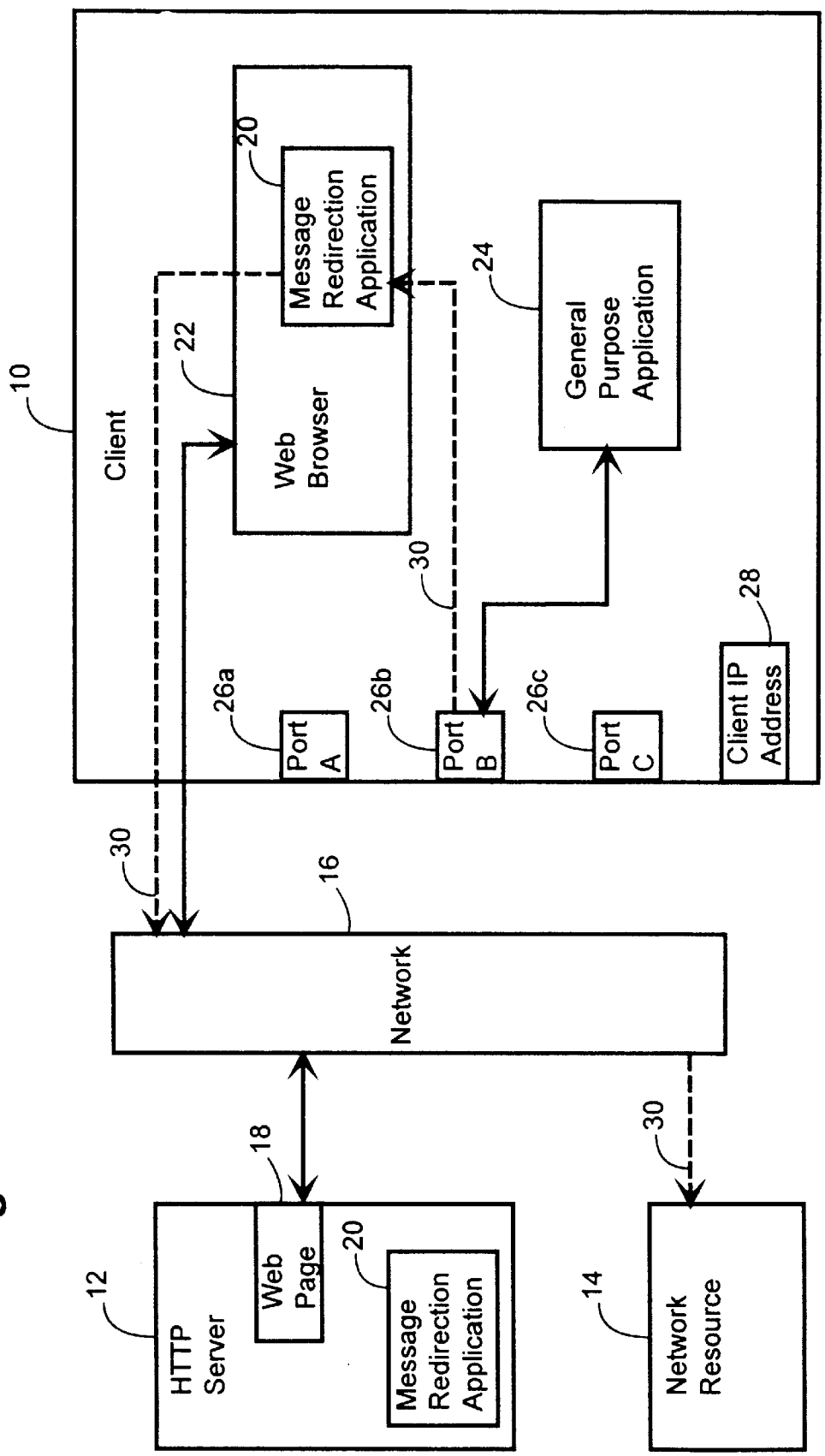
FIG. 1 is a schematic diagram of a network providing a downloadable message redirection application.

Referring to FIG. 1, client 10 connects to HTTP server 12 and network resource 14 through network 16. Network 16 can be, e.g., the Internet, or another IP-protocol-mediated network. Client 10 is typically a hardware computer having an operating system and an Internet browser. Client 10 typically has one or more transport control protocol (TCP) ports (e.g., ports A, B, and C, 26a through 26b), and an Internet protocol address (e.g., client IP address 28). HTTP server 12 provides one or more special web pages 18 accessible through network 16 by client 10. Network resource 14 can be a server or other device coupled to the network that provides functionality to client 10. Network resource 14 and HTTP server 12 can be located on the same machine, or on separate machines, possibly coupled through a local network.

Client 10 accesses web page 18 using web browser 22. Web page 18 provides a graphical pointer to message redirection application 20 for downloading by HTTP server 12 across network 16 to client 10. For example, client 10 could desire a particular service indicated by web page 18, and, by "clicking" on an icon representing that service, instigate a downloading of message redirection application 20 to web browser 22.

Message redirection application 20 can be written, for example, in a platform-independent programming language such as Java® or ActiveX®. Once downloaded, message redirection application 20 can immediately execute within browser 22. Message redirection application 20 can be configured to listen to one or more TCP or UDP (or generally, IP) ports of client 10 for messages. For example, message redirection application 20 can be configured to listen to the local host address (IP address 127.0.0.1) and its port of client 10. Or, message redirection application 20 can be configured to listen to messages addressed to the client's local IP address 28 and to another corresponding port. Message redirection application 20 can be configured to listen to one or more of these ports or addresses before it is downloaded from HTTP server 12 or after downloading, and the configuration can be automatically executed by other software instructions, or manually by a user of client 10, for example.

Once message redirection application 20 has been configured and is running, it listens for all messages on its designated port(s). A general purpose application 24 (for example, a database program) can then be configured to connect to a designated address and port, whether automatically by message redirection application 20, by some other program, or manually by the user of client 10. General purpose application 24 will then act as if its communications are solely with the designated address and port. Message redirection application 20, by listening to the designated port, redirects all message traffic, and transports it across network 16 to network resource 14 (the redirected message path is indicated by dotted lines 30). Messages destined back from network resource 14, received by client 10, are in turn rerouted back to general purpose application 24. For TCP messages, such rerouting is straightforward. For UDP datagrams, a table in memory is maintained by message redirection application 20 to track the original source port number being used by general application 24 for redirection, and send the reply message packet to that port.

As one example of this method, an off-the-shelf e-mail program (a general purpose application 24), which normally accesses an e-mail server on a LAN coupled to client 10, can instead communicate with a network resource 14 across the Internet using message redirection application 20. A user of the e-mail program (e.g., an employee traveling away from the office) could access his or her firm's web page 18 via their browser 22, and download an e-mail message redirection application (applet) 20, which upon downloading immediately executes in browser 22 as, e.g., a Java applet. The e-mail program, instead of being configured to attach to its e-mail server on the LAN, would instead be configured to attach to, e.g., its own IP address, or Local Host. The e-mail program could have an associated TCP port number (e.g., 143), or the port number could be variable. Either way, message redirection application 20 would be configured (e.g., by the firm's LAN administrator before downloading to the user) to listen on that port number, and redirect all message traffic between client 10 (of the traveling employee) and network resource 14 (the e-mail server located on the firm's LAN). By having the e-mail program connect to Local Host or its own IP address, message redirection application is able to intercept these messages at the appropriate corresponding port.

Any number of general applications 24 can be served in this way, and connected to any number of network resources 14. Message redirection application 20 can listen to any number of ports and addresses, for redirecting such message traffic. Also, any number of message redirection applications 20 can be pending at once within browser 22.

Message redirection application 20, in addition to simply and easily rerouting messages between general purpose application 24 and network resource 14, also can provide any number of message services during redirection, including encryption and compression of messages, logging of message traffic, filtering messages (that is, sending or receiving only certain messages that meet some filter criterion), vectoring messages (that is, sending a single message to multiple destinations), and real time message data analysis and adaptation (useful in diagnosing and then altering network traffic, for example). These message services can be provided by downloaded platform independent message redirection application 20 without appreciable configuration by or input from a user of client 10, and without creating a customized application for each hardware platform that will connect to network resource 14. A corresponding proxy application (not shown) located at the other end of the redirection connection (e.g., at network resource 14), can interact appropriately with these message services, for example, by decrypting incoming messages and encrypting return messages destined back to client 10.

Message redirection application 20 has selectable parameters that can be configured at HTTP server 12 before downloading to client 10, and can begin running immediately with those set parameters. These parameters can include what (if any) form of compression and encryption to use and any options for such compression and encryption, which port(s) to listen to, which network resource(s) to redirect messages to, and vectoring options for message delivery. Thus, message redirection application 20 can arrive completely configured and execute immediately, to provide a seamless and transparent connection between general purpose application 24 and network resource 14 without appreciable user input.

Figure 2:
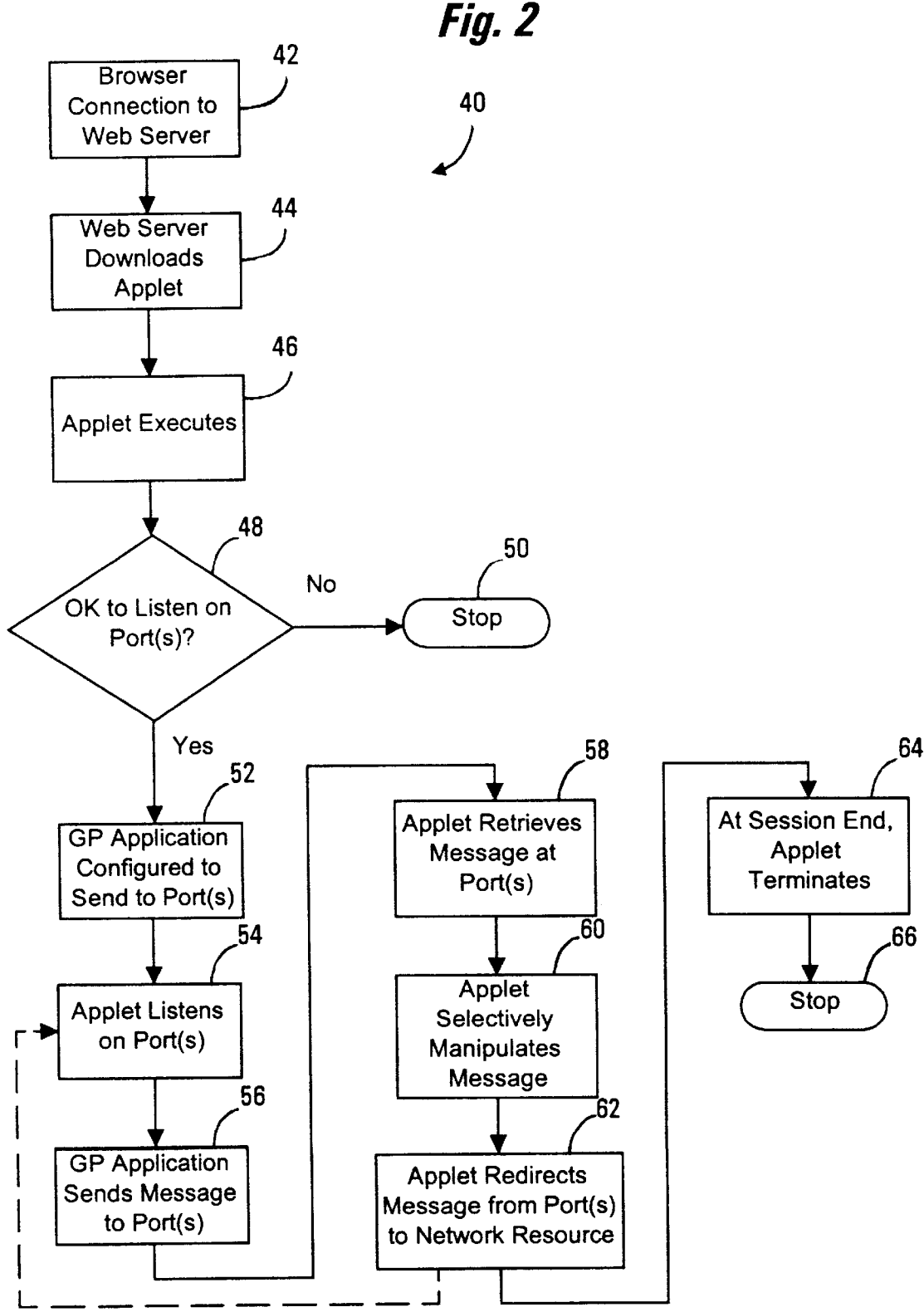
FIG. 2 is a flow chart for a message redirection session between a client and a destination network resource.

Referring to FIG. 2, message delivery method 40 begins when client 10 uses browser 22 to connect to HTTP server 12 (step 42). HTTP server 12 then downloads message redirection application 20 (for example, a Java applet) to browser 22 (step 44). Message redirection application 20 executes (step 46), and can, if configured, ask client 10 or its user if it is acceptable to listen to one or more selected ports (step 48). If such listening is not acceptable, message redirection application 20 can terminate (step 50). At this time, or before, general purpose application 24 is configured to connect to local host or the client's IP address and to transmit message traffic to and from the same selected port(s) (step 52).

Message redirection application 20 begins to listen to the selected port(s) (step 54), and, when general purpose application 24 sends a message to the selected port(s) (step 56), message redirection application 20 retrieves it (step 58), selectively manipulates the message (step 60, e.g., by compressing and encrypting the message), and redirects the message from the selected port(s) to network resource 14 (step 62). Steps 54 through 62 are repeated for as long as the communication session between general purpose application 24 and network resource 14 continues. At the end of the communication session, or when browser 22 or general purpose application 24 closes, message redirection application 20 terminates (step 64), and message redirection ends (step 66).

Referring to FIG. 3, computer program 110 (comprising executable instructions) can be placed upon any machine-readable device 100, such as a floppy disk, CD-ROM, removable hard drive, or other memory device, and can then be loaded into an HTTP server 12. Computer program 110 can include instructions which, when loaded into server 12 (or another network resource 14), provides the application software needed to generate an appropriate message redirection application 20 and web page 18, where the web page 18 allows clients to download message redirection application 20.

Other embodiments are within the scope of the claims. For example, other methods for obtaining the message redirection application can be used, including storing it locally at the client. The general purpose application can be a part of web browser 22. Message redirection application can be a separately running program, not requiring a running browser or other virtual machine to execute. Message redirection application does not need to be hardware independent. Each client, server, or network resource can be a computer or other machine having a network address. The message redirection application can be configured in a number of different ways to pass messages between a general purpose application sending messages to a local port or other local address of a client and a network resource.

What is claimed is:

1. A method for redirecting communication on a network between a client and a network resource, comprising the steps of:
   executing a software program, the software program configured to listen to at least one communications port of the client during a communication session conforming to a network protocol, the software program redirecting a message received on the communications port to the network resource.

2. The method of claim 1 further comprising downloading the software program to the client during a communication session.

3. The method of claim 2 wherein the software program is downloaded from an HTTP-protocol server.

4. The method of claim 3 further comprising configuring an HTTP-protocol browser to connect to the HTTP-protocol server to download the software program.

5. The method of claim 1 wherein the network is the Internet.

6. The method of claim 1 further comprising configuring a general purpose application running on the client to send messages to the communications port.

7. The method of claim 6 wherein the general purpose application generates the message received on the communications port.

8. The method of claim 6 wherein the general purpose application connects to either the local host address or the local IP address for the client, and the communications port is a port used by the general purpose application.

9. The method of claim 1 wherein the network resource is an IP protocol-based server.

10. The method of claim 1 wherein the software program is hardware platform independent.

11. The method of claim 2 further comprising selectively configuring the software program, before downloading to the client, with parameters for redirecting the message.

12. The method of claim 1 further comprising manipulating the message before redirecting the message to the network resource.

13. The method of claim 12 wherein manipulating the message comprises one of the following:
   encrypting the message;
   compressing the message;
   logging the message;
   filtering the message; and
   vectoring the message.

14. A method for redirecting communication on the Internet between a client and a network resource, comprising the steps of:
   configuring an HTTP-protocol browser on the client to connect to an HTTP-protocol server to download a software program, the software program being hardware platform independent;
   downloading the software program to the client during a communication session;
   configuring a general purpose application running on the client to connect to either the local host address or the local IP address for the client and to send a message destined for the network resource instead to a communications port of the client; and
   executing the software program, the software program configured to listen to at least one communications port of the client during a communication session, the software program redirecting the message received on the communications port to the network resource.

15. A storage device tangibly storing a control program, the control program, when coupled to a control device, operating the control device to redirect communication on a network between a client and a network resource, the control program being configured to operate the control device to perform the functions of:

provide a software program configured to listen to at least one communications port of the client during a communication session conforming to a network protocol, where the software program redirects a message received on the communications port to the network resource.

16. The storage device of claim 15 wherein the control program further performs the function of downloading the software program to the client during a communication session.

17. The storage device of claim 16 wherein the software program is downloaded from an HTTP-protocol server.

18. The storage device of claim 17 wherein an HTTP-protocol browser is configured to connect to the HTTP-protocol server to download the software program.

19. The storage device of claim 15 wherein the network is the Internet.

20. The storage device of claim 15 wherein a general purpose application running on the client is configured to send messages to the communications port.

21. The storage device of claim 20 wherein the general purpose application generates the message received on the communications port.

22. The storage device of claim 20 wherein the general purpose application connects to either the local host address or the local IP address for the client, and the communications port is a port used by the general purpose application.

23. The storage device of claim 15 wherein the network resource is an IP protocol-based server.

24. The storage device of claim 15 wherein the software program is hardware platform independent.

25. The storage device of claim 15 wherein the software program, before downloading to the client, is selectively configured with parameters for redirecting the message.

26. The storage device of claim 15 wherein the software program manipulates the message before redirecting the message to the network resource.

27. The storage device of claim 26 wherein the manipulation comprises one of the following:

encrypting the message;

compressing the message;

logging the message;

filtering the message; and vectoring the message.

28. A storage device tangibly storing a control program, the control program, when coupled to a control device, operating the control device to redirect communication on the Internet between a client and a network resource, the control program being configured to operate the control device to perform the functions of:

downloading a software program from an HTTP-protocol server to an HTTP-protocol browser on the client, the software program being hardware platform independent, the software program, when downloaded and executing on the client, being configured to listen to at least one communications port of the client during a communication session conforming to the HTTP-protocol, and the software program redirecting a message received on the communications port to the network resource, the message being destined for the network resource but sent to the communications port by a general purpose application running on the client, the general purpose application being connected to either the local host address or the local IP address for the client.

* * * * *